United States Patent
Sato et al.

(10) Patent No.: US 8,407,730 B2
(45) Date of Patent: Mar. 26, 2013

(54) OBJECTIVE LENS ACTUATOR FOR ENABLING TO REDUCE THE DYNAMIC TILT BETWEEN OPTICAL DISC AND OBJECTIVE LENS

(75) Inventors: Yoshihiro Sato, Hitachinaka (JP); Hidenao Saito, Yokohama (JP); Seiichi Kato, Tsuchiura (JP); Jun Hato, Fujisawa (JP); Ryuichiro Mizuno, Fujisawa (JP); Katsuhiko Kimura, Kasumigaura (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 141 days.

(21) Appl. No.: 12/632,891

(22) Filed: Dec. 8, 2009

(65) Prior Publication Data
US 2010/0149954 A1  Jun. 17, 2010

(30) Foreign Application Priority Data
Dec. 12, 2008  (JP) .................................. 2008-316591

(51) Int. Cl.
*G11B 7/00* (2006.01)
(52) U.S. Cl. ....................................................... 720/681
(58) Field of Classification Search .................. 720/681, 720/688
See application file for complete search history.

(56) References Cited

U.S. PATENT DOCUMENTS

| | | | | |
|---|---|---|---|---|
| 6,845,510 B2 * | 1/2005 | Yoshinaga | ..................... | 720/681 |
| 7,287,264 B2 * | 10/2007 | Akanuma | ..................... | 720/681 |
| 2005/0210488 A1 * | 9/2005 | Kojima | ..................... | 720/681 |
| 2006/0242660 A1 * | 10/2006 | Kimura et al. | ................. | 720/681 |
| 2007/0033603 A1 * | 2/2007 | Suzuki | ..................... | 720/681 |
| 2007/0067787 A1 * | 3/2007 | Asai | ............................ | 720/681 |
| 2008/0104622 A1 * | 5/2008 | Yabe et al. | ..................... | 720/681 |

FOREIGN PATENT DOCUMENTS

| | | |
|---|---|---|
| JP | 2003-228852 | 8/2003 |
| JP | 2008-084398 | 4/2008 |

* cited by examiner

*Primary Examiner* — David D Davis
(74) *Attorney, Agent, or Firm* — Antonelli, Terry, Stout & Kraus, LLP.

(57) ABSTRACT

An objective lens actuator 25, for driving an objective lens 1 for focusing lights upon a recoding surface of an optical disc, comprises a moving part 2, which comprises the objective lens 1 and a coil; a magnet, which is fixed on a yoke and drives the moving part 2; a plural number of elastic support parts, each of which supports the moving part 2 at an end thereof; a first fixing portion 5a and a second fixing portion 5b, which fix other ends of the plural number of elastic support parts 4 and are disposed opposite to each other in a focus direction; and a moving mechanism 6, which is provided on the first and second fixing portion 5a and 5b, so that the first and second fixing portions 5a and 5b can move in the focus direction, relatively, and thereby providing the objective lens actuator 25 enabling to reduce the dynamic relative tilt between the optical disc and the objective lens 1 (i.e., reducing the tilt of the objective lens 1 in the tangential direction when operating), as well as, an optical pickup and an optical disc drive.

8 Claims, 11 Drawing Sheets

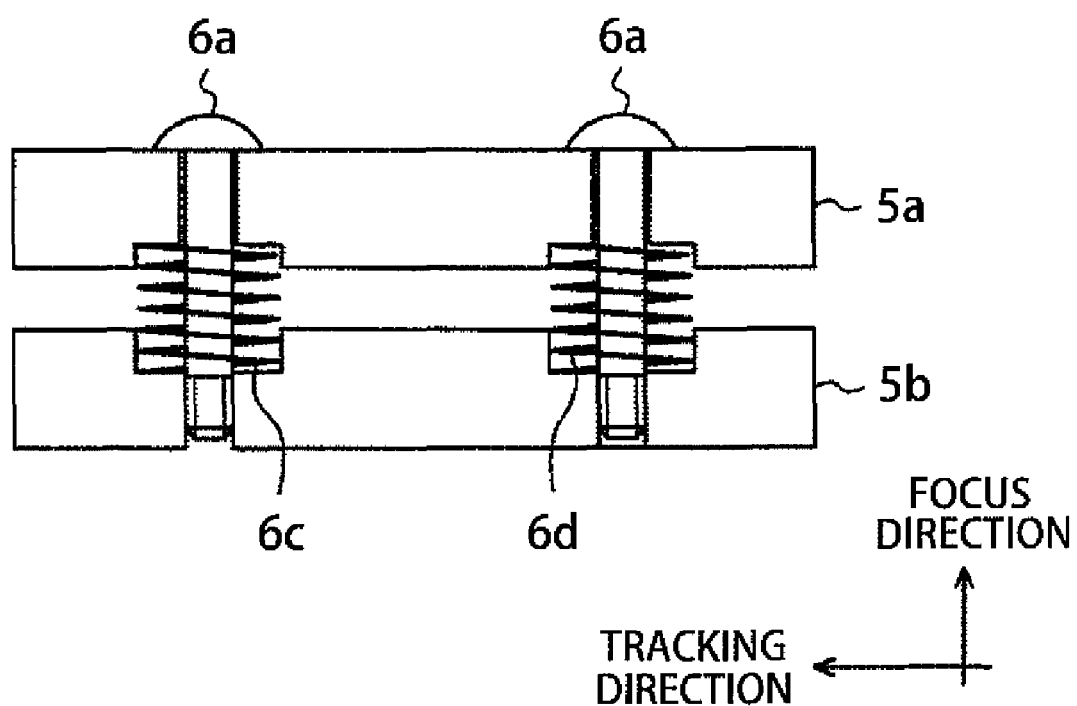

FOCUS (+) SIDE OPERATION

FOCUS (−) SIDE OPERATION

TILT CORRECTION OPERATION

OBJECTIVE LENS ACTUATOR FOR ENABLING TO REDUCE THE DYNAMIC TILT BETWEEN OPTICAL DISC AND OBJECTIVE LENS

BACKGROUND OF THE INVENTION

The present invention relates to an objective lens actuator of an optical pickup for conducting reading/writing from/onto a disc within an optical disc drive, an optical pickup comprising this objective lens actuator therein, and an optical disc drive comprising this optical pickup therein.

In recent years, advancement of high density is achieved in the optical discs, and as a method for dealing with that, mainly, wavelength of a laser is shortened or an aperture of an objective lens is enlarged. For this reason, ill influences upon the quality of an optical spot become large due to inclination of the objective lens with respect to the optical disc. Since deterioration of a signal of the optical spot due to the inclination of the objective lens is also linked up with the deterioration of a signal when recording/reproducing, there is brought about a necessity of suppressing a tilt between the optical disc and the objective lens.

In such optical disc drive, an objective lens actuator is a device for driving the objective lens for focusing lights upon a recording surface upon the optical disc into the followings: a focusing direction (i.e., a direction of approaching/parting from the surface of the optical disc), a tracking direction (i.e., a radial direction of the optical disc), and a radial tilt direction (i.e., inclining into a radial direction of the optical disc).

In such the objective lens actuator, a support arrangement for a moving portion, which is made up with a lens holder equipped with the objective lens and coils thereon, is arranged in such a manner that elastic support members, each one end thereof being fixed on the moving portion and each other end thereof on a fixed portion, i.e., straight wires build up a plural number of parallel links.

As a method for suppressing the tilt between the optical disc and the objective lens is disclosed an objective lens actuator for adjusting the tilt of the objective lens in the radial direction of the disc, in the following Patent Document 1. Also, in the following Patent Document 2 is disclosed an objective lend actuator, in which the fixed portion of the elastic support members displaceable in an axial direction is divided so that the effective length of the elastic members can be adjusted, independently, and thereby unevenness in spring stiffness of the elastic support members is corrected so as to bring an initial tilt characteristic thereof to a preferable one.

[Patent Document 1] Japanese Patent Laying-Open No. 2003-228852 (2003); and

[Patent Document 2] Japanese Patent Laying-Open No. 2008-084398 (2008).

BRIEF SUMMARY OF THE INVENTION

The conventional art disclosed in the Patent Document 1 mentioned above is for the purpose of dissolving the tile of the objective lens in the initial condition thereof, but it does not make study upon suppression of a dynamic tilt of the objective lens, such as, the objective lens shifts into a focusing direction or a tracking direction, etc. Also, the conventional art disclosed in the Patent Document 2 mentioned above, enabling correction of the unevenness of the spring stiffness of the elastic support members, is effective for the dynamic tilt of the objective lens mentioned above, but there are desired other countermeasures, being further effective.

One of the reasons of the dynamic tilt of the objective lens lies in the unevenness of parts or assembling thereof. For that reason, a relative tilt is dynamically generated between the optical disc and the objective lens, and thereby light intensity distribution of the optical spot changes; this results into deterioration of the signals when recording/reproducing.

Also, with the tilt of the objective lens with respect to the optical disc, there is a problem that the quality of recording/reproducing onto/from an optical disc is deteriorated even if it is tilted in either the radial direction or the circumferential direction with respect to the optical disc. This phenomenon is generated, remarkably, in particular in an apparatus using a short wave length laser therein, such as, a blue laser, etc. Accordingly, it is necessary to reduce the dynamic tilt of the objective lens in the circumferential direction of the optical disc (i.e., a tangential direction), which can be neglected conventionally, and for that purpose there is a necessity of a mechanism for adjusting the support arrangement of the moving portion, in advance, in a process of manufacturing the objective lens actuator.

The present invention is accomplished upon basis of the fact mentioned above, and an object thereof is to provide an objective lens actuator for enabling to reduce the dynamic relative tilt between the optical disc and the objective lens (i.e., to reduce the tile of the objective lens in the tangential direction when operating), as well as, an optical pickup and an optical disc drive.

(1) For accomplishing the object mentioned above, according to the present invention, there is provided an objective lens actuator, for driving an objective lens for focusing lights upon a recoding surface of an optical disc, comprising: a moving part, which comprises said objective lens and a coil; a magnet, which is fixed on a yoke and drives said moving part; a plural number of elastic support parts, each of which supports said moving part at an end thereof; a first fixing portion and a second fixing portion, which fix other ends of said plural number of elastic support parts and are disposed opposite to each other in a focus direction; and a moving mechanism, which is provided on said first and second fixing portion, so that said first and second fixing portions can move in the focus direction, relatively.

(2) For accomplishing the object mentioned above, according to the present invention, there is also provided an objective lens actuator, for driving an objective lens for focusing lights upon a recoding surface of an optical disc, comprising: a moving part, which comprises said objective lens and a coil; a magnet, which is fixed on a yoke and drives said moving part; a plural number, of elastic support parts, each of which supports said moving part at an end thereof; a first fixing portion and a second fixing portion, which fix other ends of said plural number of elastic support parts and are disposed opposite to each other in a focus direction; a third fixing portion, which is disposed between said first fixing portion an said second fixing portion; and a moving mechanism, which is provided on said first and second fixing portion, so that said first and second fixing portions can move in the focus direction, relatively, with respect to said third fixing portion.

(3) Also, according to the present invention, in the objective lens actuator, as described in (1) or (2) mentioned above, it is preferable that the moving mechanism connecting said fixing portions is made up with screws.

(4) Also, according to the present invention, in the objective lens actuator, as described in (1) or (2) mentioned above, it is preferable that the moving mechanism connecting said fixing portions is made up with cams.

(5) Also, according to the present invention, in the objective lens actuator, as described in (1) or (2) mentioned above, it is preferable that the moving mechanism connecting said fixing portions is made up with shims.

(6) Also, according to the present invention, in the objective lens actuator, as described in any one of (1) through (5) mentioned above, it is preferable that dispositions of said fixing portions themselves are fixed after adjusting a tilt if said moving part by means of said moving mechanism.

(7) According to the present invention, there is also provided an optical pickup having the objective lens actuator described in any one of (1) through (6) mentioned above.

(8) According to the present invention, there is also provided an optical disc drive having the optical pickup described in (7) mentioned above.

According, to the present invention, it is possible to reduce the relative dynamic tilt between the optical disc and the optical pickup to be small. As a result of this, it is possible to achieve the optical disc drive, having stability of a recording/reproducing signal and less in data error, and the optical disc drive mounting this optical pickup can also obtain high reliability thereof.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 3 is a side view for showing a moving mechanism of a tilt wire fixing portion by means of screws, in the first embodiment of the objective lens actuator, in particular, shown by an arrow "B" in FIG. 1;

DETAILED DESCRIPTION OF THE PREFERRED EMBODIMENTS

Hereinafter, explanation will be made on an objective lens actuator, an optical pickup and an optical disc drive, according to the present invention, by referring to the attached drawings.

Figure 1:
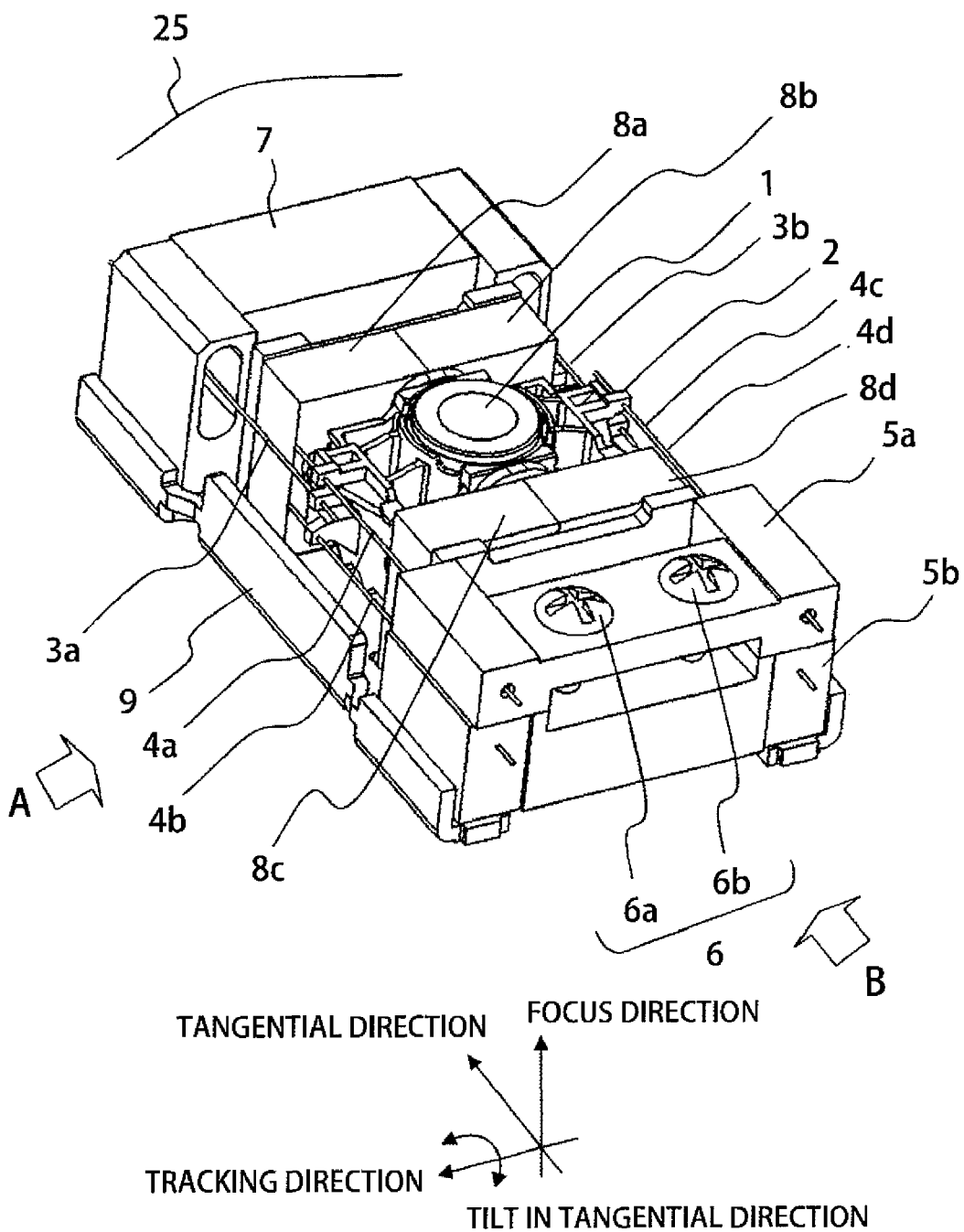
FIG. 1 is a perspective view for showing a first embodiment of an objective lens actuator, according to the present invention.
Figure 2:
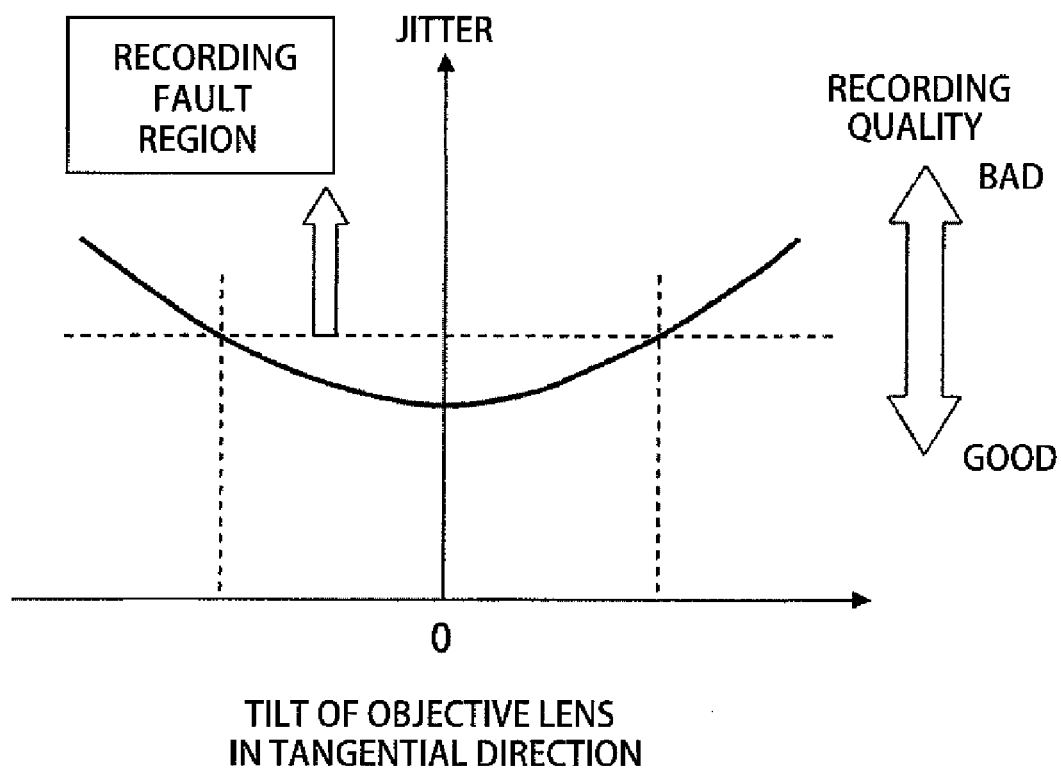
FIG. 2 is a view for showing a jitter characteristic when an objective lens is tilted in a tangential direction of an optical disc with respect to an optical disc.
Figure 4A:
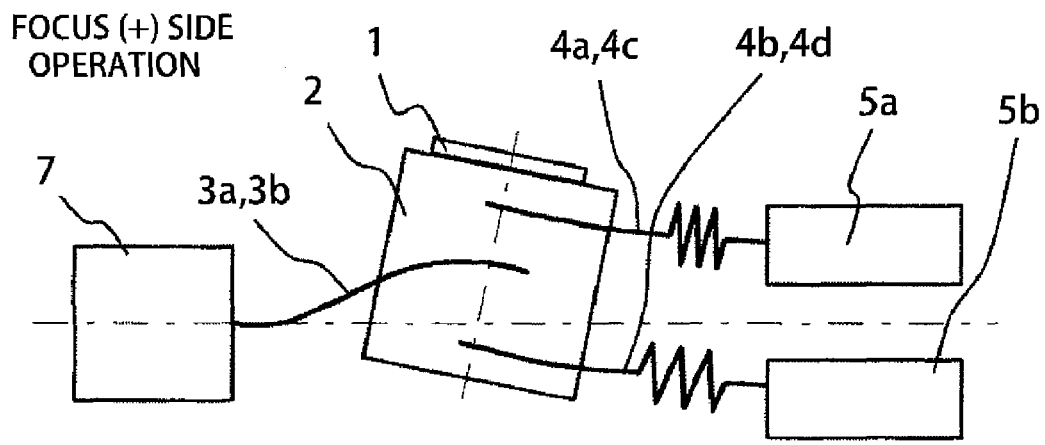
FIGS. 4A to 4C are views for explaining correction action of the objective lens in the tangential direction, in the first embodiment of the objective lens actuator, in particular, shown by an arrow "A" in FIG. 1.
Figure 4B:
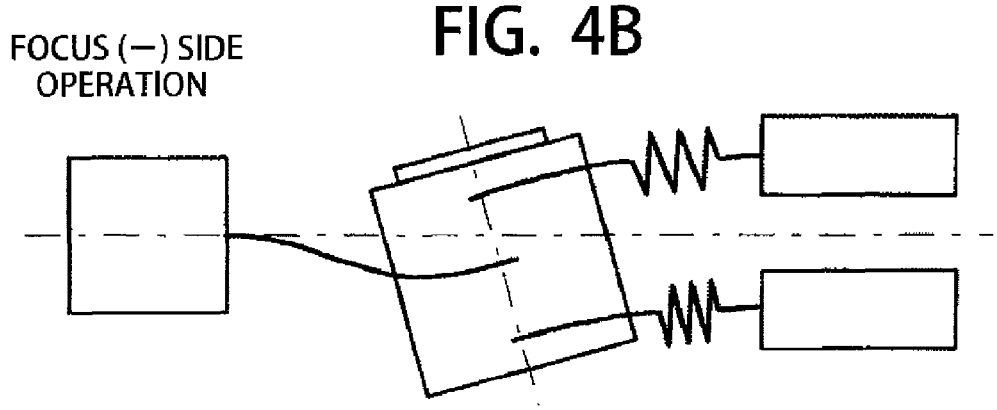
Figure 4C:
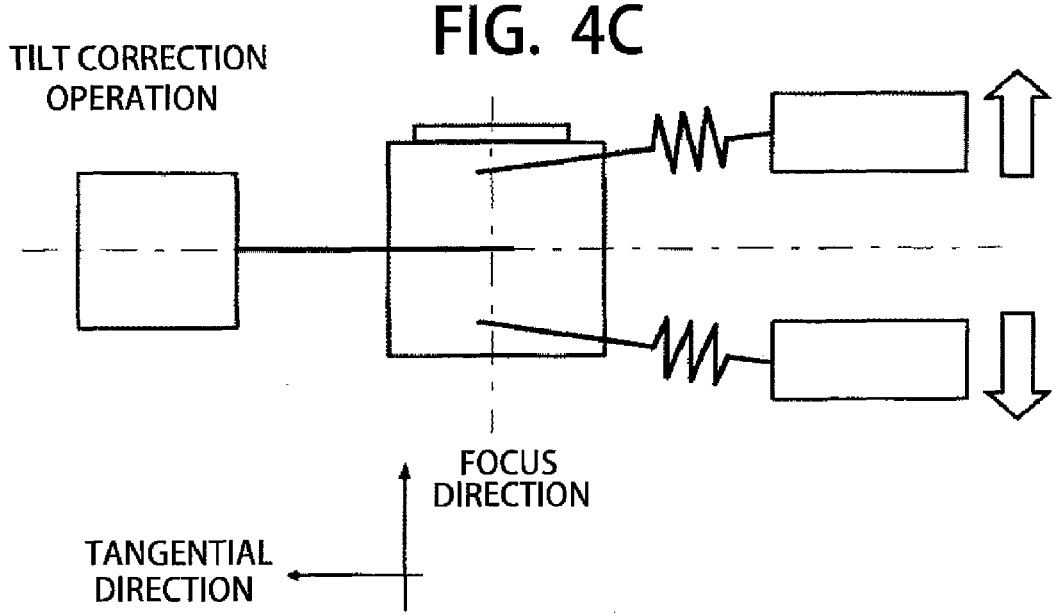
Figure 5:
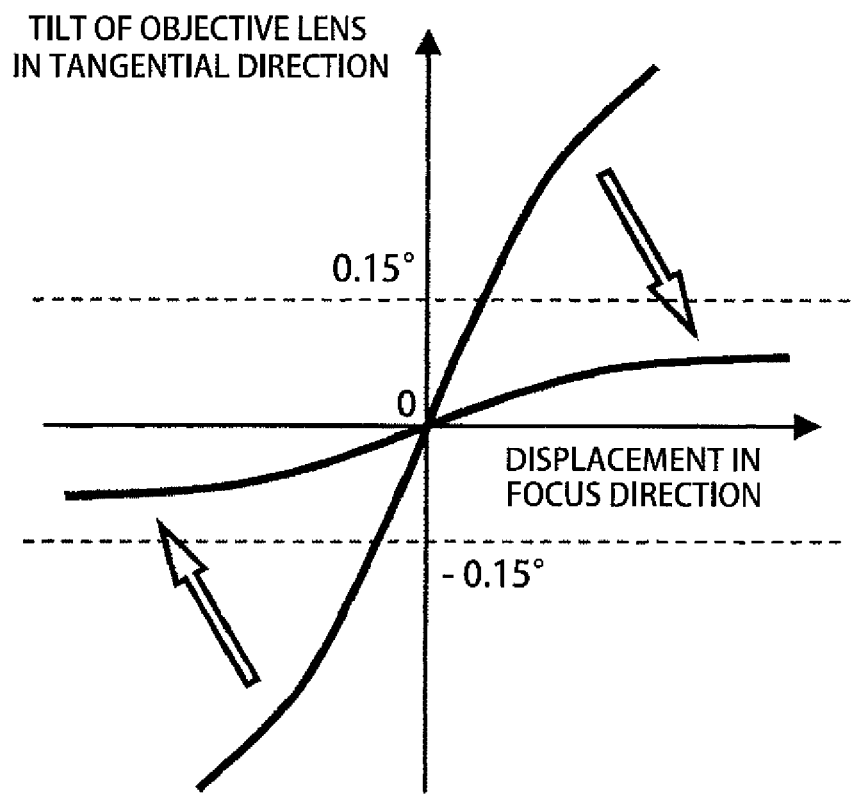
FIG. 5 is a graph for showing a measurement result of tilting conditions in the tangential direction when the objective lens is moved in a focus direction, in the first embodiment of the objective lens actuator of the present invention.

Explanation will be made on a first embodiment of the objective lens actuator according to the present invention, by referring to FIGS. 1 to 5 attached herewith. FIG. 1 is a perspective view for showing a first embodiment of an objective lens actuator, according to the present invention; FIG. 2 is a view for showing a jitter characteristic when an objective lens is tilted in a tangential direction of an optical disc with respect to an optical disc; FIG. 3 is a side view for showing a moving mechanism of a tilt wire fixing portion by means of screws, in the first embodiment of the objective lens actuator, in particular, shown by an arrow "B" in FIG. 1; FIGS. 4A to 4C are views for explaining correction action of the objective lens in the tangential direction, in the first embodiment of the objective lens actuator, in particular, shown by an arrow "A" in FIG. 1; and FIG. 5 is a graph for showing a measurement result of tilting conditions in the tangential direction when the objective lens is moved in a focus direction, in the first embodiment of the objective lens actuator of the present invention.

As is shown in FIG. 2, the jitter is an index for showing the correctness or accuracy when reproducing data of an optical disc, but it is also an index for showing the correctness or accuracy when recording data thereon. An increase of the jitter value means deterioration of recording quality. The jitter is influenced largely when the objective lens is tilted in the radial direction of the optical disc, rather than when it is tilted in the circumferential direction thereof. Correction when the objective lens is tilted in the radial direction of the optical disc is already accomplished, as is described in the Patent Document 1.

However, within an optical pickup applying therein a short wavelength laser, such as, a blue-color laser, for example, due to the characteristics thereof, it is necessary to apply a lens therein, having a high NA, and then influences given upon the jitter by an objective lens tilting in the circumferential direction of the optical disc, which can be neglected up to now, comes to be large. For this reason, it is necessary to provide a mechanism for adjusting a tilt of an objective lens 1 to the circumferential direction of the optical disc, in advance.

Features of the present embodiment lies in that there are included elastic support members, including elastic support members, being built up with a plural number of straight beams 3a and 3b, each elastically supporting a lens holder 2 at one end thereof, and a plural number of beams 4a, 4b, 4c and 4d, each also elastically supporting it at one end thereof, in the similar manner, and being extensible in an axial direction thereof, and fixing portions 7, 5a and 5b for fixing other ends of those fixing portions, wherein the fixing portions 5a and 5b, being built up with the extensible beams 4a, 4b, 4c and 4d, are disposed or arranged opposite to each other in a focus direction, and are connected with each other through a moving mechanism 6; i.e., they can be moved in a perpendicular direction, relative to an axis of the elastic support member.

In the present embodiment, the straight beams 3a and 3b and the beams 4a, 4b, 4c and 4d extensible in the axial direction are made from wires, and therefore, hereinafter, the straight beams 3a and 3b are called, "straight wires", and the beams 4a, 4b, 4c and 4d extensible in the axial direction are called, "tilt wires", respectively. The straight beams 3a and 3b and the beams 4a, 4b, 4c and 4d extensible in the axial direction also may be made from a plate spring other than the wire shown in the present embodiment.

Onto the lens holder 2 is attached the objective lens 1. Drive of the lens holder 2 is conducted through electromagnetic workings acting between coils, which are mounted on the lens holder 2 but not shown in the figure, and magnets 8a, 8b, 8c and 8d, which are disposed on the surfaces opposite thereto, so that the objective lens 1 can obtain a laser spot (i.e., focus) on an optical disc not shown in the figure.

Since the objective lens 1 mounted on the lens holder 2 must be located at a nominal (or neutral) position thereof when no electromagnetic workings, i.e., no driving forces are generated on the coils of the lens holder 2, therefore on the lens holder 2 are attached one ends of the support wires 3a and 3b and the tilt wires 4a, 4b, 4c and 4d, while other ends of the support wires 3a and 3b and the tilt wires 4a, 4b, 4c and 4d are attached onto the fixing portions 7, 5a and 5b.

The positional relationships among the support wires 3a and 3b and the tilt wires 4a, 4b, 4c and 4d are so that the tilt wires 4a, 4b, 4c and 4d are disposed at an upper end and a lower end of the focus direction and in a middle thereof are disposed the support wires 3a and 3b from a side opposite to the tangential direction. Thus, the lens holder 2 is elastically supported by two (2) pieces of support wires and four (4) pieces of tilt wires, i.e., by six (6) pieces of wires in total.

The fixing portions 5a and 5b, being fixing ends for the upper and lower tilt wires 4a, 4b, 4c and 4d, are disposed opposite to each other in the focus direction, i.e., the fixing portion 5a for the upper tilt wires 4a and 4c and the fixing portion 5b for the lower tilt wires 4b and 4d, and the moving mechanism 6 is disposed between the both fixing portion 5a and 5b, so that each can move in the focus direction, relatively.

As is shown in FIG. 3, the moving mechanism 6 according to the present embodiment, is made up with screws 6a and 6b, wherein through holes are opened on the fixing portion 5a for the upper tilt wires, and into those through holes are inserted the screws 6a and 6b. On the fixing portion 5b for the lower tilt wires are formed female screw portions (i.e., grooves) to be spirally fixed with the screws 6a and 6b, and by screwing up the screws 6a and 6b into the female screw portions, the fixing portion 5a for the upper tilt wires and the fixing portion 5b for the lower tilt wires are connected with.

Also, as is shown in FIG. 3, into a gap between the fixing portions 5a and 5b for the tilt wires are inserted coil springs 6c and 6d, each having a spring constant in the focus direction at a portion surrounding the screw 6a or 6b. With such structures, binding force due to the screws 6a and 6b and compression force due to coil springs 6c and 6d are in balance, and therefore the fixing portions 5a and 5b for the tilt wires are stabilized. Namely, the moving mechanism 6, relaxing the screws 6a and 6b, enables the fixing portions 5a and 5b for the tilt wires to move in the focus direction, relatively, from the nominal positions thereof, and a result thereof, it is possible to correct the tilt of the lens holder 2 in the tangential direction.

The lens holder 2 is movable in the directions of a focus, a tracking, a radial tile, and tangential, and the coils, which are mounted on the lens holder 2 but not shown in the figure, are also disposed corresponding to the directions mentioned above. Magnets 8a, 8b, 8c and 8d for generating the electromagnetic works between those coils are supported on a yoke 9, for the purpose of holding themselves, spatially, and for building up magnetic circuits. Also, the yoke 9 has a function of holding an objective lens actuator 25, as a whole thereof, in addition to holding a group of the magnets mentioned above.

Next, explanation will be made on the operations of the first embodiment of the present invention, by referring to FIGS. 4A to 4C. Those FIGS. 4A to 4C show the operations of each portion of the objective lens actuator 25, in case where stiffness of the support wires 3a and 3c is smaller than the stiffness of the tilt wires 4a, 4b, 4c and 4d.

When the objective lens 1 is controlled into a plus (+) side direction of focus (i.e., in an upper side in FIGS. 4A to 4C) to move, then the lens holder 2 is tilted in the tangential direction (i.e., the clockwise direction in FIGS. 4A to 4C), as is shown in FIG. 4A. For correcting this tilt, it is enough to conduct the correction of giving an axial force in a direction of correcting the tilt of the lens holder, from the tilt wires 4a and 4c towards a connecting portion 21 between the lens holder 2 and the tilt wires 4a and 4c.

In more details thereof, it can be achieved by moving the fixing portion 5a of the tilt wires 4a and 4c into plus the focus (+) side direction (i.e., in the upper side in FIGS. 4A to 4C).

When the objective lens 1 is controlled to move into a focus (−) side direction (i.e., in a lower side in FIGS. 4A to 4C), the lens holder 2 is tilted in a direction opposite to the tilt when it moves into the focus (+) side direction, as is shown in FIG. 4B. For correcting this tilt, it is achieved by moving the fixing portion 5b of the tilt wires 4b and 4d in the focus (−) side direction (i.e., in the lower side in FIGS. 4A to 4C), as is shown in FIG. 4C.

A jitter value increases as the tilt of the objective lens 1 in the tangential direction increases, as is shown in FIG. 2, then recording quality is deteriorated. Since a region where the jitter value is equal or greater than a predetermined value can be defined as a recording fault region, it is possible to determine a permissible maximum value of tilt of the objective lens 1 from that predetermined jitter value. This permissible maximum value of tilt of the objective lens 1 is approximately 0.15 degree or less than that, in case of the optical pickup applying the blue color laser therein.

FIG. 5 shows a result of measuring the tile of the objective lens 1 in the tangential direction, when applying the construction according to the present embodiment therein. Regions of displacement in the focus direction are defined to be (−) side and (+) side centering around the nominal portion of the lens holder 2.

In case where no adjustment is made on the movement of the fixing portions 5a and 5b of the tilt wires 4a, 4b, 4c and 4d, the tilt of the objective lens 1 largely exceeds 0.15 degree, i.e., the upper limit value thereof, within the displacement in focus direction. However, when adjusting the movement of the fixing portions 5a and 5b of the tilt wires 4a, 4b, 4c and 4d, the tilt of the objective lens comes to be equal or less than 0.15 degree.

On the other hand, the stiffness of the support wires 3a and 3b is smaller than that of the tilt wires 4a, 4b, 4c and 4d, the tilt of the lens holder 2 in the tangential direction comes to be opposite to that of the present embodiment mentioned above. Accordingly, by adjusting the fixing portions 5a and 5b of the tilt wires 4a, 4b, 4c and 4d into the direction opposite to that of the present embodiment, it is possible to suppress the tilt of the lens holder 2 in the tangential direction when it is moved into the focus direction.

As was mentioned above, within the objective lens actuator 25, after completing the adjustment of the tilt in the tangential direction, i.e., after completing adjustment of relative movement of the fixing portions 5a and 5b for the upper and the lower tilt wires in the focus direction, for fixing completely, the fixing portions 5a and 5b for the upper and the lower tilt wires are fixed with each other, through an adhesive or an external fixing mechanism.

With the first embodiment, i.e., the objective lens actuator 25, the optical pickup and the optical disc drive, according to the present invention mentioned above, since the tilt of the objective lens 1 can be corrected in the circumferential direction of the optical disc, i.e., the tangential direction, it is possible to make the dynamic relative tilt between the optical disc and the objective lens 1. As a result of this, there can be achieved an optical pickup of high reliability, having stability of a recording/reproducing signal and less in data error. Further, with mounting this optical pickup thereon, there can be obtained an optical disc drive having high reliability.

Figure 6:
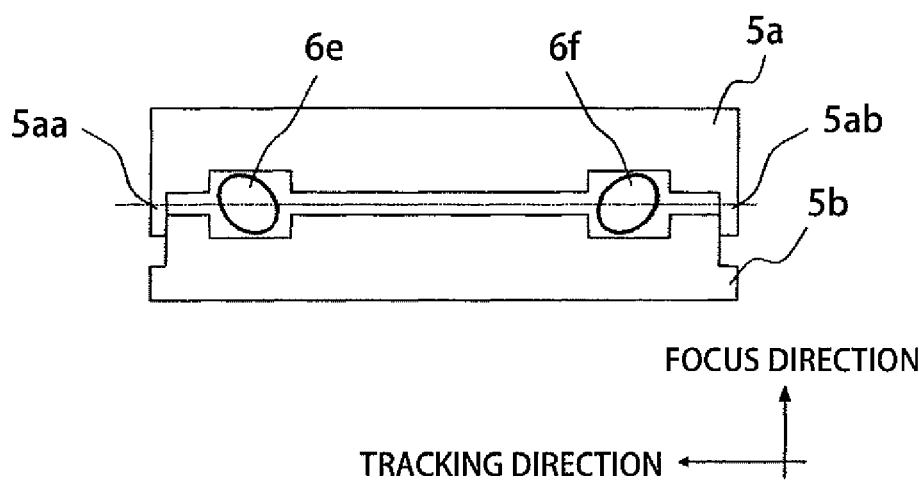
FIG. 6 is a side view for showing a moving mechanism of a tilt wire fixing portion by means of cams, in a second embodiment of the objective lens actuator of the present invention, in particular, shown by the arrow "B" in FIG. 1.

A second embodiment of the objective lens actuator according to the present invention will be explained by referring to FIG. 6 attached herewith. This FIG. 6 is a side view of the second embodiment of the objective lens actuator, in particular, shown by an arrow "B" in FIG. 1, i.e., for showing a moving mechanism of the fixing portions for the tilt wires by means of cams. However, in this FIG. 6, those attached with the same reference numerals as shown in FIGS. 1 to 5 are the same parts or the parts corresponding thereto, and therefore the explanation thereof will be omitted herein.

The feature of the present embodiment lies to apply, not the screw, but cams 6e and 6f as the moving mechanism 6, as is shown in FIG. 6. Into a gap between the fixing portions 5a and 5b for the tilt wires is inserted the cam mechanisms, being freely rotatable in a tracking direction. Further, not to generate displacement at the fixing portions 5a and 5b for the tilt wires in the tracking direction, due to the rotating forces of the cams 6e and 6f, for example, engagement portions 5aa and 5ab are formed on an outer periphery of the fixing portion 5a for the upper tilt wires, to be in a nested shape.

With the second embodiment of the objective lens actuator mentioned above, according to the present invention, as well as, obtaining the same effects to those obtainable in the first embodiment mentioned above, it is possible to move or shift the fixing portions 5a and 5b for the tilt wires, relatively, from the nominal position in the focus direction, by adjusting a rotation angle of the cams 6e and 6f, and thereby correcting the tile of the lens holder 2 in the tangential direction. Also, adjustment of the rotation angle of the cam mechanism can be made from the tangential direction of the objective lens actuator 25. Accordingly, the adjustment can be made, easily, even when the gap in the focus direction is small, of the objective lens actuator 25, which is mounted on the optical pickup, for example.

Further, it is also possible to correct the tilt of the lens holder 2 in the tangential direction, by inserting a shim into the gap between the fixing portions 5a and 5b for the upper and the lower tilt wires and adjusting this shim, i.e., with shifting the fixing portions 5a and 5b for the tilt wires from the nominal position into the focus direction, relatively.

Figure 7:
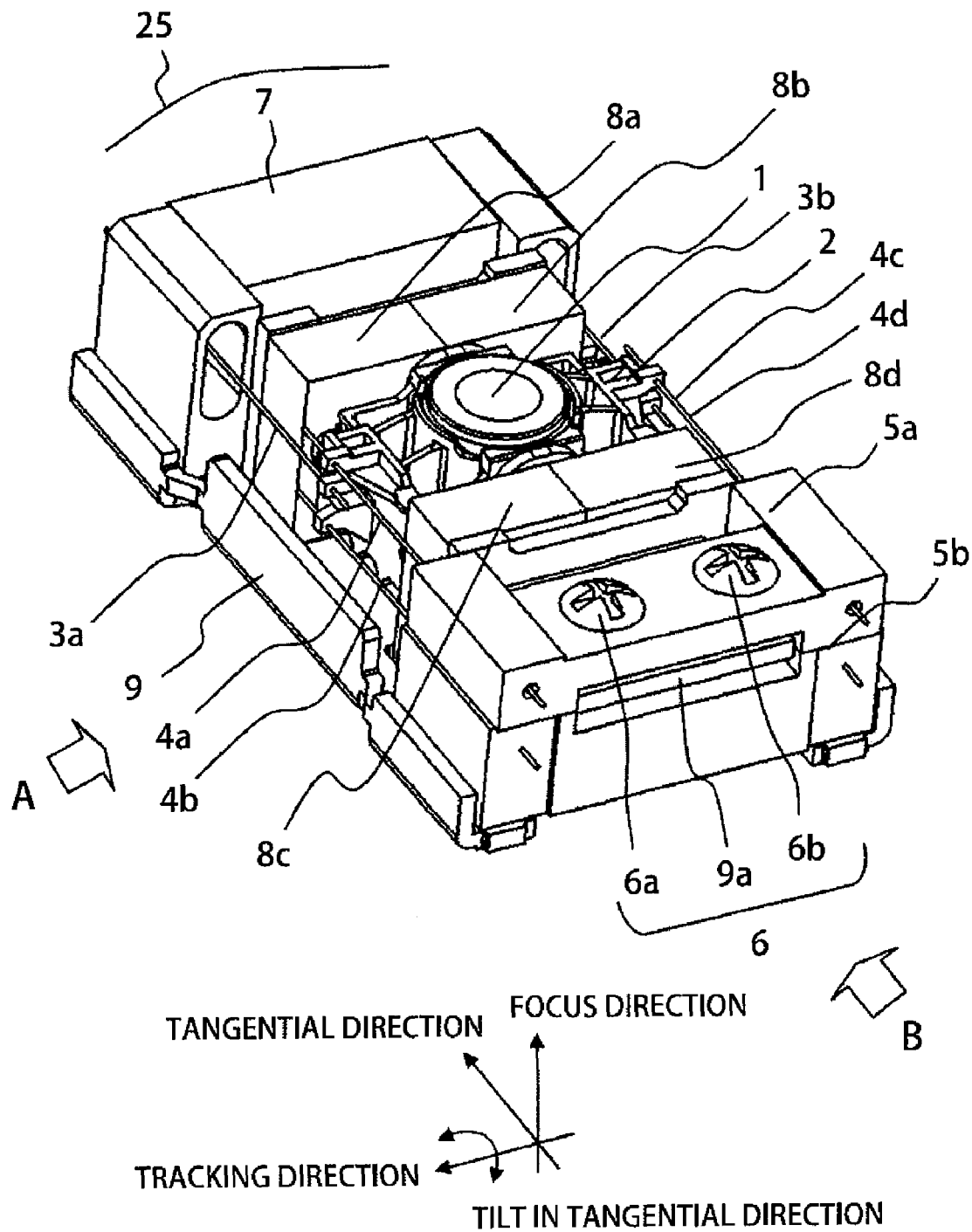
FIG. 7 is a perspective view for showing a third embodiment of the objective lens actuator, according to the present invention.
Figure 8:
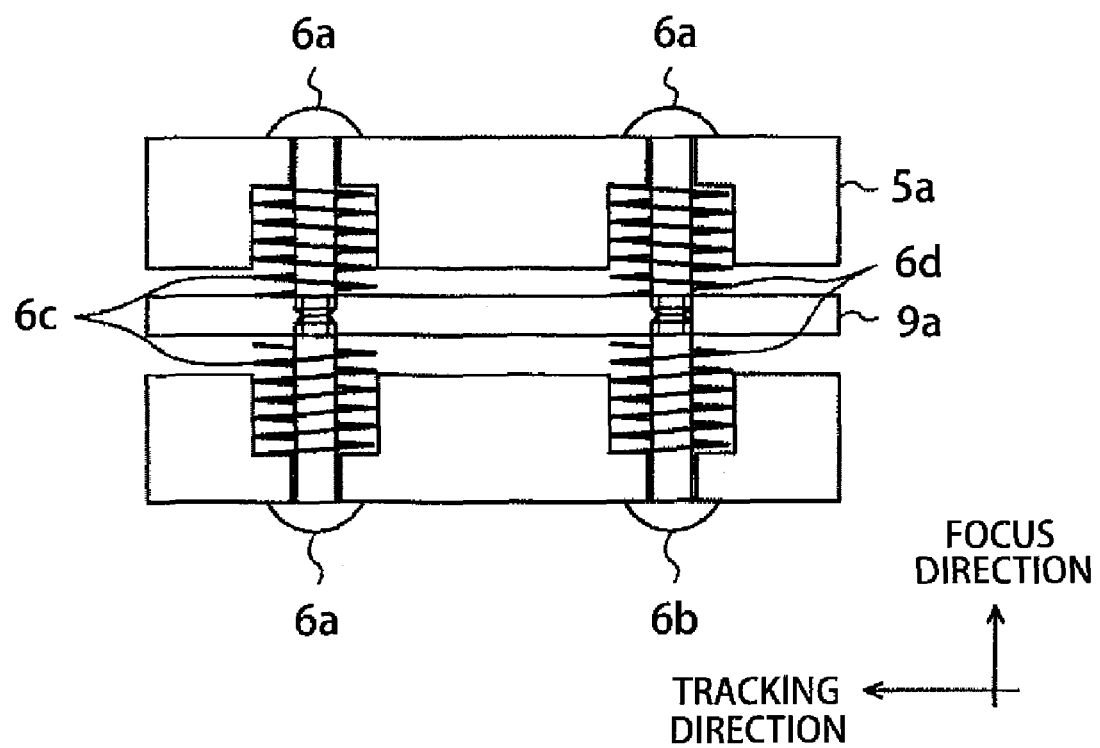
FIG. 8 is a side view for showing a moving mechanism of a tilt wire fixing portion by means of screws, in the third embodiment of the objective lens actuator, in particular, shown by an arrow "B" in FIG. 7.
Figure 9:
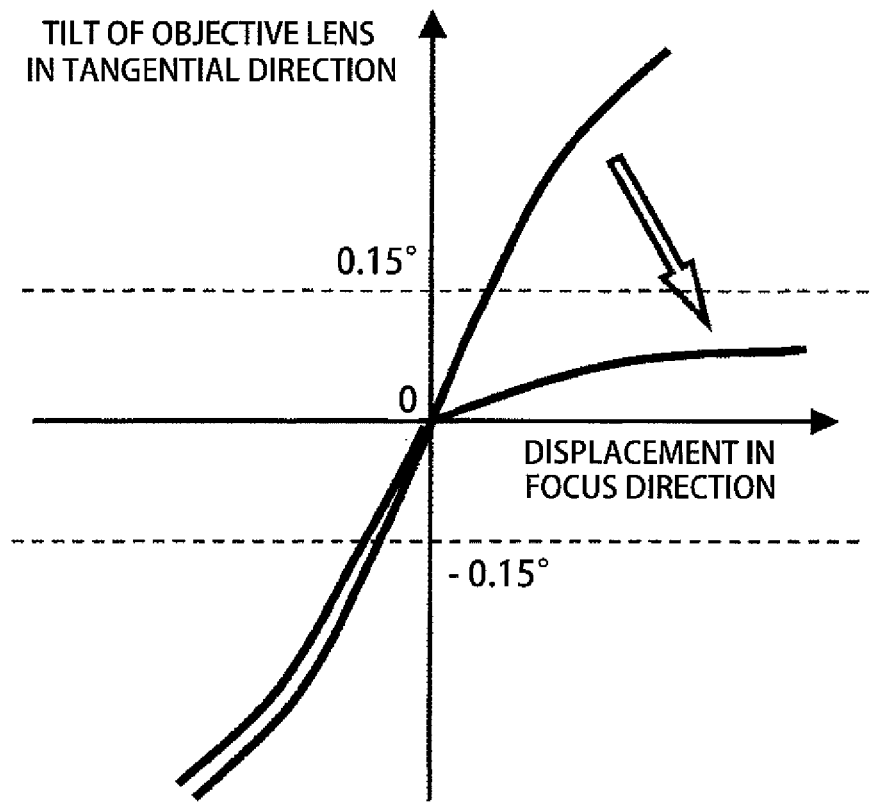
FIG. 9 is a graph for showing a measurement result of tilting conditions in the tangential direction when the objective lens is moved in a focus direction, in the third embodiment of the objective lens actuator of the present invention.

A third embodiment of the objective lens actuator according to the present invention will be explained, by referring to FIGS. 7 to 9 attached herewith. FIG. 7 is a perspective view for showing the third embodiment of the objective lens actuator according to the present invention; FIG. 8 is a side view of the third embodiment of the objective lens actuator according to the present invention, in particular, shown by an arrow "B" in FIG. 7, i.e., for showing a moving mechanism of the fixing portions for the tilt wires by means of screws; and FIG. 9 is a graph for showing a measurement result tilting condition of the objective lens in the tangential direction when it is moved in the focus direction, within the third embodiment of the objective lens actuator according to the present invention.

The feature of the present embodiment lies in that, in the first embodiment, the fixing portions 5a and 5b for the tile wires 4a, 4b, 4c and 4d are disposed opposite to each other in the focus direction, and between those fixing portions 5a and 5b is disposed the entire fixing portion 9a from the yoke 9, etc., wherein the entire fixing portion 9a and the fixing portions 5a and 5b for the tilt wires 4a, 4b, 4c and 4d are connected by the moving mechanism 6, so that they can move in the vertical direction, relatively, with respect to an axis of the elastic support member.

With the fixing portions 5a and 5b, i.e., fixed ends of the upper and the lower tilt wires 4a, 4b, 4c and 4d, the fixing portion 5a for the upper tilt wires 4a and 4c and the fixing portion 5b for the lower tilt wires 4b and 4d are disposed opposite to each other in the focus direction, and at around a middle between the fixing portions 5a and 5b for the upper and the lower tilt wires is disposed a plate-like fixing portion 9a extending from the yoke 9. The moving mechanism 6 is disposed between the plate-like fixing portion 9a and the fixing portions 5a and 5b for the upper and the lower tilt wires, so that each one of the fixing portions 5a and 5b for the upper and the lower tilt wires can move in the focus direction, relatively.

As is shown in FIG. 8, the moving mechanism 6 according to the present embodiment is built up with screws 6a and 6b, and through holes are opened on an upper side of the fixing portion 5a for the upper tilt wires and on the lower side of the fixing portion 5b for the lower tilt wires, respectively, and into those through holes are inserted the screws 6a and 6b, respectively. In the plate-like fixing portion 9a extending from the yoke 9 are formed female screw portions to be spirally fixed with the screws 6a and 6b, and by screwing up the screws 6a and 6b into the female screw portions, the plate-like fixing portion 9a and the fixing portion 5a for the upper tilt wires, or the plate-like fixing portion 9a and the fixing portion 5b for the lower tilt wires are connected with.

Also, as is shown in FIG. 8, into the gaps defined between the fixing portions 5a and 5b for the upper and the lower tilt wires and the plate-like fixing portion 9a extending from the yoke 9 are inserted coil springs 6c and 6d, each having a spring constant at a portion surrounding the screw 6a or 6b in the focus direction. With such structures, binding force due to the screws 6a and 6b and compression force due to coil springs 6c and 6d are in balance, and therefore the fixing portions 5a and 5b for the tilt wires are stabilized. Namely, the moving mechanism 6, relaxing the screws 6a and 6b, enables the fixing portions 5a and 5b for the tilt wires to move in the focus direction, relatively, from the nominal positions thereof, and a result thereof, it is possible to correct the tilt of the lens holder 2 in the tangential direction.

FIG. 9 shows a result of measuring the tilt of the objective lens 1 in the tangential direction, with applying the structures according to the present embodiment therein. An adjustment of the tilt in the tangential direction is made only on the focus (+) side, and the region of focus displacement is set on (+) side including (−) side, centering around the nominal position of the lens holder 2.

In case when no adjustment is made upon movement of the fixing portion 5a for the tilt wires 4a and 4c, the tilt of the objective lens 1 exceeds the upper limit value 0.15 degree, largely, within the displacement in the focus direction. However, when conducting the adjustment upon movement of the fixing portion 5a for the tilt wires 4a and 4c, then it comes to be equal or less than 0.15 degree. Also, the region where the correction is made lies on the focus (+) side, while the focus (−) side shows behavior or action almost same to that before the correction is made thereon. This means that the region is dependent, where the correction can be made through adjustment of the fixing portion 5a for the upper tilt wires.

Accordingly, if there is a cause of reason other than unbalance between the stiffness of the support wires 3a and 3b and the stiffness of the tilt wires 4a, 4b, 4c and 4d, i.e., the behavior or action on the focus (+) side is different from that on the focus (−) side, it is possible to suppress the tilt of the lens holder 2 in the tangential direction, effectively, by adjusting the fixing portions 5a and 5b for the tilt wires, up and down.

On the other hand, in case where the stiffness of the support wires 3a and 3b is smaller than the stiffness of the tilt wires 4a, 4b, 4c and 4d, the tilt of the lens holder 2 in the tangential direction moves into the reversed direction comparing to the present embodiment mentioned above. Accordingly, by adjusting the fixing portions 5a and 5b for the tilt wires into the direction opposite to the present embodiment, it is possible to suppress the tilt in the tangential direction when moving the lens holder 2 in the focus direction.

After completing the adjustment of tilt in the tangential direction, within the objective lens actuator 25, as was mentioned above, i.e., after completing the adjustment upon relative movement of the fixing portions 5a and 5b for the upper and the lower tilt wires in the tangential direction, for the purpose of fixing them completely, the fixing portions 5a and 5b for the upper and the lower tilt wires themselves and the entire fixing portion 9a are fixed through an adhesive or an external fixing mechanism.

With the first embodiment, i.e., the objective lens actuator 25, the optical pickup and the optical disc drive, according to the present invention mentioned above, since the tilt of the objective lens 1 can be corrected, effectively, in the circumferential direction of the optical disc, within the entire region of the focus operation i.e., the tangential direction, it is possible to make the dynamic relative tilt between the optical disc and the objective lens 1. As a result of this, there can be achieved an optical pickup of high reliability, having stability of a recording/reproducing signal and less in data error. Further, with mounting this optical pickup thereon, there can be obtained an optical disc drive having high reliability.

Figure 10:
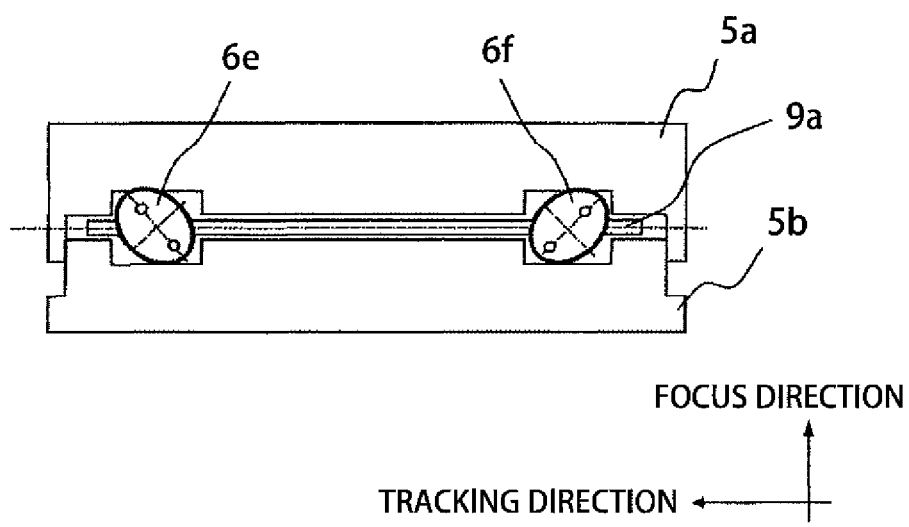
FIG. 10 is a side view for showing a moving mechanism of a tilt wire fixing portion by means of cams, in a fourth embodiment of the objective lens actuator of the present invention, in particular, shown by the arrow "B" in FIG. 7.

A fourth embodiment of the objective lens actuator according to the present invention will be explained by referring to FIG. 10 attached herewith. This FIG. 10 is a side view of the fourth embodiment of the objective lens actuator, in particular, shown by an arrow "B" in FIG. 7, i.e., for showing a moving mechanism of the fixing portions for the tilt wires by means of cams. However, in this FIG. 10, those attached with the same reference numerals as shown in FIGS. 1 to 9 are the same parts or the parts corresponding thereto, and therefore the explanation thereof will be omitted herein.

The feature of the present embodiment lies to apply, not the screw, but cams 6e and 6f as the moving mechanism 6, as is shown in FIG. 10. Into a gap between the fixing portions 5a and 5b for the tilt wires is disposed the plate-like fixing portion 9a extending from the yoke 9, and the cams 6e and 6f are disposed between the plate-like fixing portion 9a and the fixing portions 5a and 5b for the upper and the lower tilt wires, so that each of the fixing portions 5a and 5b for the upper and the lower tilt wires can move in the focus direction, relatively.

Further, not to generate displacement at the fixing portions 5a and 5b for the tilt wires in the tracking direction, due to the rotating forces of the cams 6e and 6f, for example, engagement portions 5aa and 5ab are formed on an outer periphery of the fixing portion 5a for the upper tilt wires, to be in the nested shape.

With the fourth embodiment of the objective lens actuator mentioned above, according to the present invention, as well as, obtaining the same effects to those obtainable in the third embodiment mentioned above, it is possible to move or shift the fixing portions 5a and 5b for the tilt wires, relatively, from the nominal position in the focus direction, by adjusting a rotation angle of the cams 6e and 6f, and thereby correcting the tile of the lens holder 2 in the tangential direction. Also, adjustment of the rotation angle of the cam mechanism can be made from the tangential direction of the objective lens actuator 25. Accordingly, the adjustment can be made, easily, even when the gap in the focus direction is small, of the objective lens actuator 25, which is mounted on the optical pickup, for example.

Further, it is also possible to correct the tilt of the lens holder 2 in the tangential direction, by inserting a shim into the gap between the fixing portions 5a and 5b for the upper and the lower tilt wires and adjusting this shim, i.e., with shifting the fixing portions 5a and 5b for the tilt wires from the nominal position into the focus direction, relatively.

Figure 11:
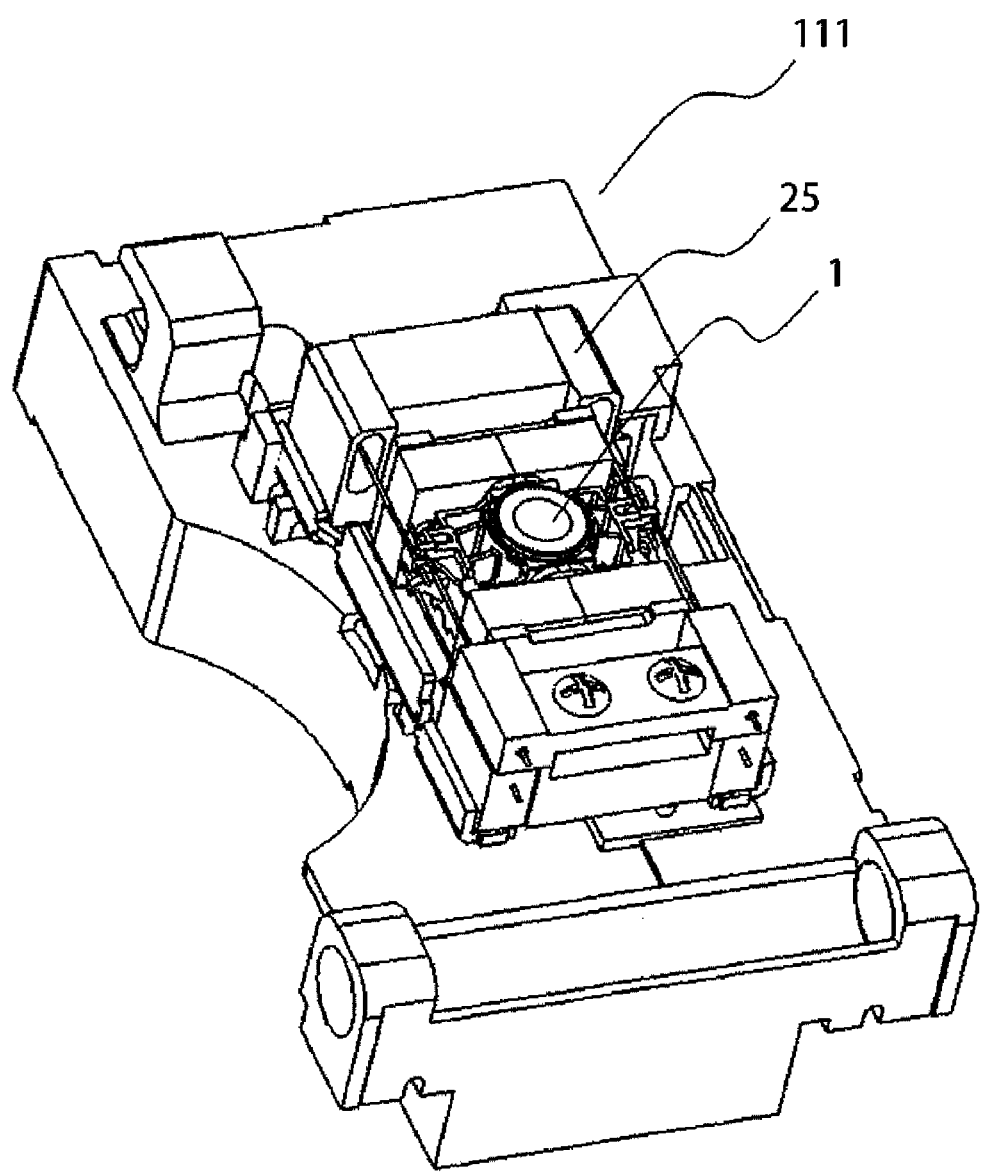
FIG. 11 is a perspective view for showing a condition, in particular, when mounting the first embodiment of the objective lens actuator according to the present invention onto an optical pickup.

A fifth embodiment of the objective lens actuator according to the present invention will be explained by referring to FIG. 11 attached herewith. This FIG. 11 is a perspective view for showing the condition of mounting the objective lens actuator, according to the first embodiment of the present invention, onto an optical pickup. However, though showing an example, herein, applying the objective lens actuator 25 shown in the first embodiment mentioned above into the optical pickup 111, but the optical pickup 111 can be constructed in the similar manner even in the case when applying the objective lens actuator 25 shown in the other embodiments.

As is shown in FIG. 11, the objective lens actuator 25 is mounted on the optical pickup 111. Lights emitting from a light emitting element (not shown in the figure), which is mounted on the optical pickup 111, are focused upon the optical disc by the function of the objective lens 1.

In this manner, with applying the objective lens actuator 25 according to the present invention, it is possible to obtain the optical pickup 111, being suitable for high integration and having high reliability.

Figure 12:
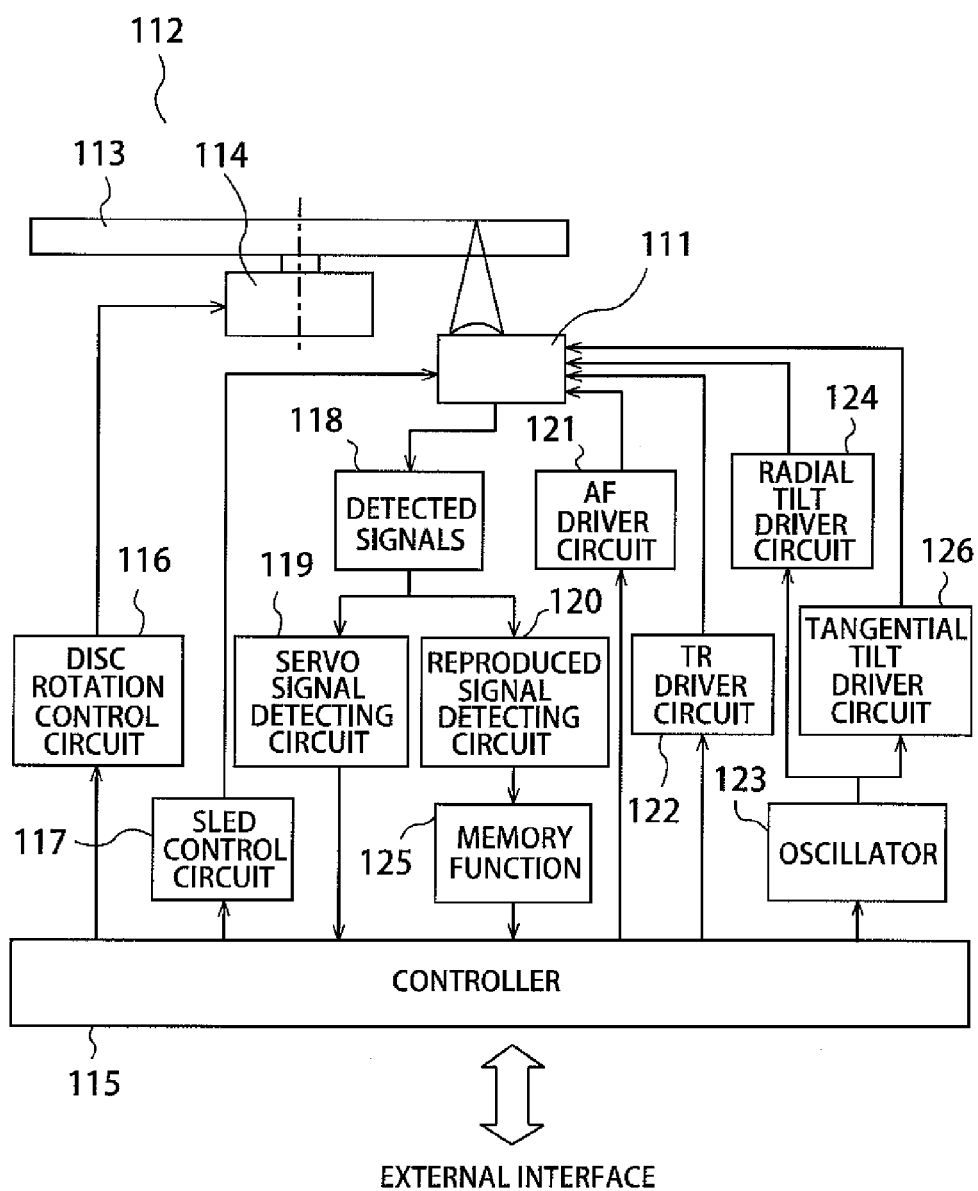
FIG. 12 is a block diagram for showing a circuit configuration of the optical disc drive, in particular, when applying the first embodiment of the objective lens actuator according to the present invention therein.

A sixth embodiment of the objective lens actuator according to the present invention will be explained by referring to FIGS. 12 and 13 attached herewith. FIG. 12 is a block diagram for showing the circuit configuration of the optical disc drive, in particular, when applying the first embodiment of the objective lens actuator according to the present invention therein; and FIG. 13 is a graph for showing changes of an output signal due to the tilt of the object lens to the optical disc in the optical disc drive shown in FIG. 12.

An optical disc drive 112 comprises therein a spindle motor 114 for rotating an optical disc 113, the optical pickup 111, a sled mechanism for moving the optical pickup 111 into the radial direction of the optical disc 113, and a controller 115 for controlling those. With the controller 115 is connected a rotation control circuit 116 for the spindle motor 114, thereby conducting rotation control of the optical disc 113 attached on the spindle motor 114. Also, with the controller 115 is connected a sled control circuit 117 for the optical pickup 111, thereby conducting sled control for moving the optical pickup 111 into the radial direction of the optical disc 113.

Various kinds of signals 118 detected by the optical pickup 111 are transferred to a servo signal detection circuit 119 and a reproduced signal detection circuit 120, wherein a focus error signal and a track error signal are generated within the servo signal detection circuit 119, and in combination with an instruction from the controller 115, position control is conducted on the objective lens 4, in the focus direction and the tracking direction thereof, upon basis of the signals from signals from a focusing driver circuit 121 and a tracking driver circuit 122.

Figure 13:
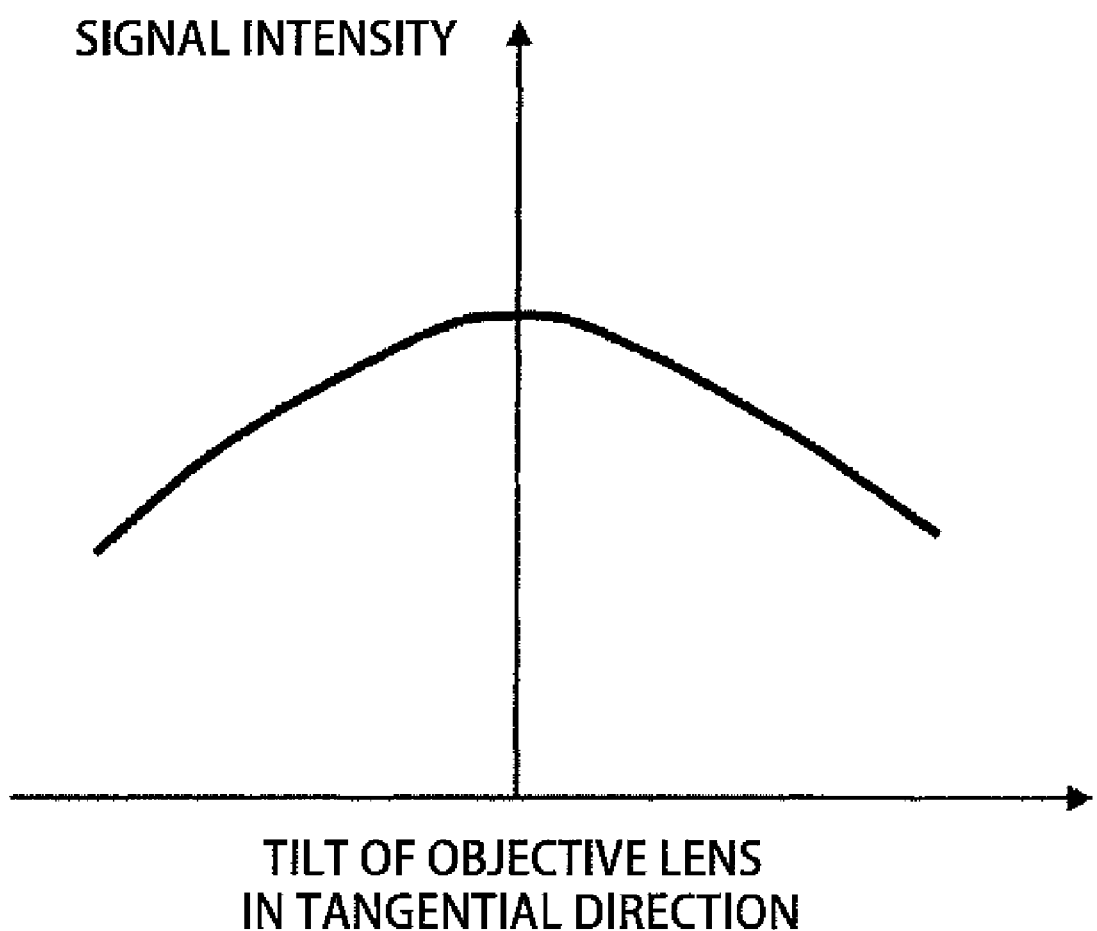
FIG. 13 is a graph for showing changes of an output signal due to the tilt of the object lens to the optical disc in the optical disc drive shown in FIG. 12.

Herein, an output signal generated due to the tilt between the optical disc 113 and the objective lens 1 in FIG. 13. From this FIG. 13, in case where no tilt is generated between the optical disc 113 and the objective lens 1, then the output signal goes up to the maximum. With obtaining the tilt of the objective lens 1 where the output signal goes up to the maximum, while tilting the objective lens 1 in the radial direction or the tangential direction, with using this phenomenon, it is possible to reduce the tilt between the optical disc 113 and the objective lens 1 to be small.

Thus, while driving a radial tilt driver circuit 124 through an oscillator 123, the output signals generated during the time when the optical pickup travels round the optical disc 113 are stored in a memory function 125, and then a most suitable radial tilt drive current can be obtained. In the similar manner, while driving a tangential tilt driver circuit 126 through the oscillator 123, the output signals generated during the time when the optical pickup travels round the optical disc 113 are stored in the memory function 125, and then a most suitable tangential tilt drive voltage or current can be obtained.

With applying the radial tilt and the tangential tilt drive currents mentioned above into the radial tilt driver circuit 124 and the tangential tilt driver circuit 126, again, it is possible to reduce the tilt between the optical disc 113 and the objective lens 1 to be small, and thereby achieving the optical disc drive 112 being suitable for high integration thereof.

The function for obtaining the most suitable drive voltage or current mentioned above can be obtained with using a linear approximation, while sampling the innermost periphery and/or the outermost periphery of the optical disc 113. Herein, if obtaining an approximation equation of a $n^{th}$ dimension function with setting the sampling at three (3) or more places on the optical disc 113, then it is possible to reduce the tilt between the optical disc 113 and the objective lens 1, over the entire surface of the optical disc 113.

In accordance with the present embodiment, with applying the optical pickup 111 mounting the objective lens actuator 25 according to the present invention thereon, into the optical disc drive 112, it is possible to obtain the optical disc drive 112, having stability of a recording/reproducing signal and less in data error.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An objective lens actuator, for driving an objective lens for focusing lights upon a recoding surface of an optical disc, comprising:
a moving part, which comprises said objective lens and a coil;
a magnet, which is fixed on a yoke and drives said moving part;
a plural number of tilt wires, being extendable in axial directions thereof, each of which supports said moving part at an end thereof;
an upper section for fixing an end of one of said plural number of tilt wires close to said objective lens in a focusing direction;
a lower section for fixing the other end of said one of said plural number of tilt wire far from said objective lens in the focusing direction, and being disposed opposing to said upper section in the focusing direction;
support wires for supporting said moving part from a side opposite to said one of the plural number of tilt wires;
said upper section and said lower section, which fix other ends of said plural number of tilt wires being extendable in axial directions thereof, and are disposed opposite to each other in a focus direction; and
a moving mechanism, which connects said upper section and said lower section and is provided on said upper and lower sections, so that said upper and lower sections can move in the focus direction, relatively,
wherein said moving mechanism further comprising screws that connect said upper and lower sections and coil springs that are inserted into a gap between said upper and lower sections, with each spring having a spring constant in the focus direction.

2. The objective lens actuator, as described in the claim 1, wherein dispositions of said fixing portions themselves are fixed after adjusting a tilt if said moving part by means of said moving mechanism.

3. An optical pickup having the objective lens actuator described in the claim 1.

4. An optical disc drive having the optical pickup described in the claim 3.

5. An objective lens actuator, for driving an objective lens for focusing lights upon a recoding surface of an optical disc, comprising:
a moving part, which comprises said objective lens and a coil;
a magnet, which is fixed on a yoke and drives said moving part;
a plural number of tilt wires, being extendable in axial directions thereof, each of which supports said moving part at an end thereof;
an upper section for fixing an end of one of said plural number of tilt wires close to said objective lens in a focusing direction;
a lower section for fixing the other end of said one of said plural number of tilt wire far from said objective lens in the focusing direction, and being disposed opposing to said upper section in the focusing direction;
support wires for supporting said moving part from a side opposite to said one of the plural number of tilt wires;
said upper section and said lower section, which fix other ends of said plural number of tilt wires being extendable in axial directions thereof, and are disposed opposite to each other in a focus direction;
a middle section, which is disposed between said upper and lower sections; and
a moving mechanism, which connects said upper and lower sections and is provided on said upper and lower sections, so that said upper and lower sections can move in the focus direction, relatively, with respect to said middle section,
wherein said moving mechanism further comprising screws that connect said upper and lower sections and coil springs that are inserted into a gap between said upper and lower sections, with each spring having a spring constant in the focus direction.

6. The objective lens actuator, as described in the claim 5, wherein dispositions of said sections themselves are fixed after adjusting a tilt if said moving part by means of said moving mechanism.

7. An optical pickup having the objective lens actuator described in the claim 5.

8. An optical disc drive having the optical pickup described in the claim 7.

* * * * *